US011871790B2

(12) United States Patent
Courbat et al.

(10) Patent No.: US 11,871,790 B2
(45) **Date of Patent: *Jan. 16, 2024**

(54) SUSCEPTOR FOR USE WITH AN INDUCTIVELY HEATED AEROSOL-GENERATING DEVICE OR SYSTEM

(71) Applicant: Altria Client Services LLC, Richmond, VA (US)

(72) Inventors: Jerome Courbat, Colombier (CH); Ihar Nikolaevich Zinovik, Peseux (CH); Oleg Mironov, Cudrefin (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,067

(22) Filed: Feb. 8, 2023

(65) Prior Publication Data

US 2023/0180819 A1 Jun. 15, 2023

Related U.S. Application Data

(63) Continuation of application No. 15/946,280, filed on Apr. 5, 2018, now Pat. No. 11,576,424, which is a (Continued)

(30) Foreign Application Priority Data

Apr. 5, 2017 (EP) .................................... 17164907

(51) Int. Cl.
*A24B 15/167* (2020.01)
*H05B 6/10* (2006.01)
(Continued)

(52) U.S. Cl.
CPC .......... *A24F 40/465* (2020.01); *A24B 15/167* (2016.11); *A24F 40/44* (2020.01); (Continued)

(58) Field of Classification Search
CPC ...... A24B 15/167; A24F 40/465; A24F 40/44; A24F 40/42; A24F 40/10; A24F 47/00; H05B 6/108
See application file for complete search history.

(56) References Cited

U.S. PATENT DOCUMENTS 7,537,716 B2 5/2009 Matsunaga et al.
2003/0230567 A1* 12/2003 Centanni ................ F22B 1/282 219/628

(Continued)

FOREIGN PATENT DOCUMENTS

CN 103689812 A 4/2014
CN 203748673 U 8/2014

(Continued)

OTHER PUBLICATIONS

Extended European Search Report #17164907 dated Oct. 19, 2017.

(Continued)

*Primary Examiner* — Justin C Dodson
(74) *Attorney, Agent, or Firm* — Harness, Dickey & Pierce, P.L.C.

(57) ABSTRACT

An inductively heatable susceptor for use with an inductively heated aerosol-generating device or system includes an open-porous inductively heatable ceramic material configured to hold an aerosol-forming liquid and configured to heat the aerosol-forming liquid under the influence of an alternating electromagnetic field. A cartridge for use with an aerosol-generating device includes an aerosol-forming liquid and a susceptor. An aerosol-generating device includes a susceptor.

19 Claims, 7 Drawing Sheets

Related U.S. Application Data continuation of application No. PCT/EP2018/055971, filed on Mar. 9, 2018.

(51) Int. Cl.

| | |
|---|---|
| ***F22B 1/28*** | (2006.01) |
| ***A24F 40/42*** | (2020.01) |
| ***A24F 40/44*** | (2020.01) |
| ***A24F 40/465*** | (2020.01) |
| *A24F 40/10* | (2020.01) |

(52) U.S. Cl.

CPC ............. *F22B 1/281* (2013.01); *H05B 6/108* (2013.01); *A24F 40/10* (2020.01); *A24F 40/42* (2020.01)

(56) References Cited

U.S. PATENT DOCUMENTS

| | | | | |
|---|---|---|---|---|
| 2005/0013083 | A1 | 1/2005 | Takazawa et al. | |
| 2011/0204042 | A1 | 8/2011 | Wakashima et al. | |
| 2011/0297668 | A1 | 12/2011 | Swanson | |
| 2014/0076310 | A1* | 3/2014 | Newton | A61M 15/06 128/202.21 |
| 2015/0177252 | A1 | 6/2015 | Gualberto et al. | |
| 2015/0320116 | A1 | 11/2015 | Bleloch et al. | |
| 2015/0335071 | A1 | 11/2015 | Brinkley et al. | |
| 2016/0120221 | A1 | 5/2016 | Mironov et al. | |
| 2016/0150825 | A1 | 6/2016 | Mironov et al. | |
| 2017/0027233 | A1 | 2/2017 | Mironov | |
| 2017/0079330 | A1 | 3/2017 | Mironov et al. | |
| 2017/0119046 | A1* | 5/2017 | Kaufman | H05B 6/365 |
| 2017/0119047 | A1* | 5/2017 | Blandino | A24C 5/01 |
| 2017/0119054 | A1 | 5/2017 | Zinovik et al. | |
| 2017/0188626 | A1 | 7/2017 | Davis et al. | |
| 2018/0014573 | A1 | 1/2018 | Silvestrini et al. | |
| 2018/0192700 | A1 | 7/2018 | Fraser et al. | |

FOREIGN PATENT DOCUMENTS

| | | | |
|---|---|---|---|
| CN | 105307516 | A | 2/2016 |
| CN | 205624467 | U | 10/2016 |
| CN | 106163309 | A | 11/2016 |
| CN | 106455711 | A | 2/2017 |
| CN | 106455713 | A | 2/2017 |
| EP | 2991516 | A1 | 3/2016 |
| EP | 3145344 | A1 | 3/2017 |
| JP | 2016526873 | A | 9/2016 |
| JP | 2017506915 | A | 3/2017 |
| KR | 2005-0113178 | A | 12/2005 |
| KR | 2016-0003283 | A | 1/2016 |
| KR | 2017-0008209 | A | 1/2017 |
| RU | 2645205 | C1 | 2/2018 |
| RU | 2651452 | C1 | 4/2018 |
| WO | WO-2010118644 | A1 | 10/2010 |
| WO | WO-2015/177044 | A1 | 11/2015 |
| WO | WO-2015/177254 | A1 | 11/2015 |
| WO | WO-2015177043 | A1 | 11/2015 |
| WO | WO-2015177045 | A1 | 11/2015 |
| WO | WO-2015177252 | A1 | 11/2015 |
| WO | WO-2015177294 | A1 | 11/2015 |
| WO | WO-2017001818 | A1 | 1/2017 |

OTHER PUBLICATIONS

International Search Report and Written Opinion for corresponding International Application No. PCT/EP2018/055971 dated May 17, 2018.

Written Opinion for corresponding International Application No. PCT/EP2018/055971 dated Mar. 5, 2019.

Russian Search Report for corresponding RU Application 2019135062 dated Aug. 9, 2021, with English language translation.

Russian Decision to Grant for corresponding RU Application 2019135062, dated Sep. 10, 2021, with English language translation.

Chinese Office Action for CN Application 201880017783.0, dated Dec. 22, 2021, with English language translation.

Substantive Examination Report for Philippines Application No. 1/2019/501909 dated Jun. 9, 2022 (5 pages).

Japanese Office Action for JP Patent Application No. 2019-550723 dated May 18, 2022 (3 pages).

Chinese Office Action in CN Application 201880017783.0 dated Jun. 21, 2022, with English translation (16 pages).

Ferrite (magnet), https://web.archive.org/web/20160112043127/https://en.wikipedia.org/wiki/Ferrite_(magnet) (Year: 2015).

Japanese Decision to Grant for JP Application 2019-550723 dated Feb. 13, 2023, with English language translation (4 pages).

South Korean Office Action for KR Application 2019-7030532 dated Feb. 8, 2023 with English language translation (12 pages).

South Korean Notice of Allowance for KR Application 2019-7030532 dated Aug. 24, 2023 with English language translation (5 pages).

* cited by examiner

SUSCEPTOR FOR USE WITH AN INDUCTIVELY HEATED AEROSOL-GENERATING DEVICE OR SYSTEM

CROSS-REFERENCE TO RELATED APPLICATIONS

This is a continuation of U.S. application Ser. No. 15/946,280, filed on Apr. 5, 2018, which is a continuation of and claims priority to PCT/EP2018/055971 filed on Mar. 9, 2018, and further claims priority to EP 17164907.2 filed on Apr. 5, 2017; the contents of each of which are hereby incorporated by reference in their entirety.

BACKGROUND

Field

At least one example embodiment relates to a susceptor configured to hold and inductively heat an aerosol-forming liquid. At least one example embodiment relates to a cartridge for use with an aerosol-generating device. At least one example embodiment relates to aerosol-generating device and system for generating an aerosol by inductively heating an aerosol-forming liquid.

Description of Related Art

Aerosol-generating systems (also called "vapor-generating systems") based on inductively heating an aerosol-forming substrate may comprise an induction source configured to generate an alternating electromagnetic field which induces at least one of heat generating eddy currents or hysteresis losses in a susceptor. The heated susceptor is in thermal proximity of an aerosol-forming substrate which is configured to release volatile compounds to form an aerosol upon heating. Depending on the type of the aerosol-generating system, the susceptor and the aerosol-forming substrate may be provided together in an aerosol-generating article, in particular in a cartridge. The cartridge may be configured to be received in a cavity of an aerosol-generating device which in turn includes the induction source. In many devices, the susceptor may only be in contact with a small portion of the aerosol-forming substrate, which may result in inhomogeneous heating across the substrate volume such that the temperature of the substrate is partially too low to form an aerosol. Consequently, only a small portion of the substrate is effectively utilized during vaping. Yet, increasing the heating power in order to heat up all portions of the substrate to the required temperature for aerosol formation may cause local overheating of those portions being in direct contact with the susceptor.

SUMMARY

At least one example embodiment relates to at least one inductively heatable susceptor for use with an aerosol-generating device or system. The susceptor comprises an open-porous inductively heatable ceramic material configured to hold a portion of an aerosol-forming liquid and configured to heat the portion of the aerosol-forming liquid under the influence of an alternating electromagnetic field. The susceptor is in the form of at least one of a compact body or a plurality of susceptor elements.

At least one example embodiment relates to an aerosol-generating device configured to generate an aerosol by inductively heating a portion of an aerosol-forming liquid. The aerosol-generating device comprises an induction source including an induction coil configured to generate an alternating electromagnetic field and a susceptor configured to hold and heat a portion of an aerosol-forming liquid. The susceptor includes an open-porous inductively heatable ceramic material configured to hold the portion of the aerosol-forming liquid. The susceptor is in the form of at least one of a compact body or a plurality of susceptor elements. The susceptor is positioned relative to the induction coil so as to be inductively heatable by the alternating electromagnetic field.

At least one example embodiment relates to a cartridge for use with an aerosol-generating device. The cartridge comprises an aerosol-forming liquid and an inductively heatable susceptor. The susceptor includes an open-porous inductively heatable ceramic material configured to hold a portion of the aerosol-forming liquid and configured to heat the portion of the aerosol-forming liquid under the influence of an alternating electromagnetic field. The susceptor is in the form of at least one of a compact body or a plurality of susceptor elements.

At least one example embodiment relates to an aerosol-generating system for generating a vapor by inductively heating a portion of an aerosol-forming liquid. The system comprises a cartridge including the aerosol-forming liquid and an inductively heatable susceptor. The susceptor includes an open-porous inductively heatable ceramic material configured to hold a portion of the aerosol-forming liquid and configured to heat the portion of the aerosol-forming liquid under the influence of an alternating electromagnetic field. The susceptor is in the form of at least one of a compact body or a plurality of susceptor elements. The aerosol-generating system also includes an aerosol-generating device including a device housing including a cavity configured to receive at least a portion of the cartridge and an induction source within the device housing. The induction source includes an induction coil configured to generate an alternating electromagnetic field. The susceptor of the cartridge is positionable in the cavity relative to the induction coil so as to be inductively heatable by the alternating electromagnetic field.

BRIEF DESCRIPTION OF THE DRAWINGS

The susceptor, cartridge, aerosol-generating device, and aerosol-generating system will be further described, by way of example only, with reference to the accompanying drawings.

DETAILED DESCRIPTION

Figure 1:
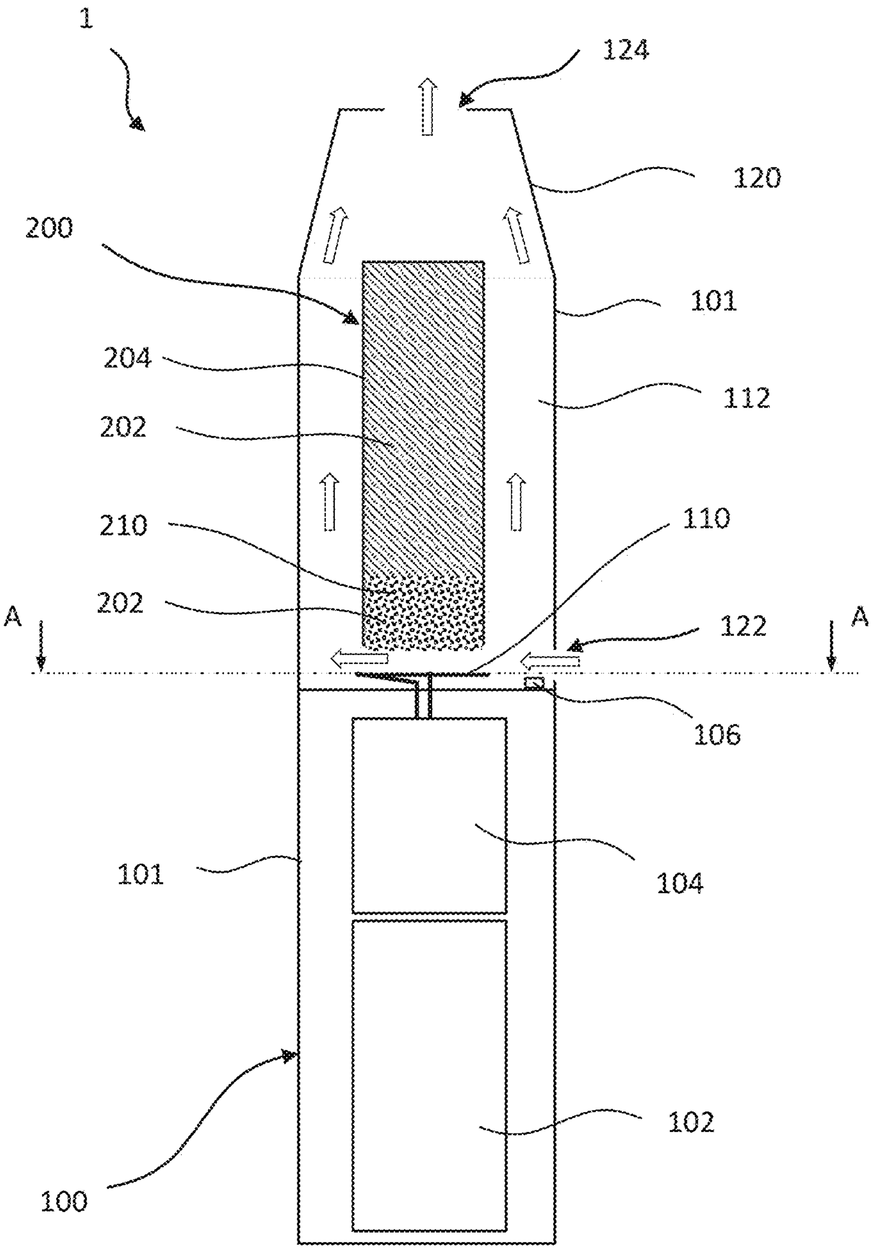
FIG. 1 schematically illustrates an aerosol-generating system in accordance with at least one example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

According to at least one example embodiment, an inductively heatable susceptor for use with an aerosol-generating device or system (also called a vapor-generating device or system) includes an open-porous inductively heatable ceramic material configured to hold an aerosol-forming liquid (also called a vapor-forming liquid) and configured to heat the liquid under the influence of an alternating electromagnetic field. In particular, the susceptor may be made or consist of this open-porous ceramic material.

The ceramic material may have an open-porous or open-pored structure and is heatable under the influence of an alternating electromagnetic field. Due to this, the susceptor is both, a storage medium for aerosol-forming liquid to be heated and a heating element configured to inductively heat the liquid held therein. The susceptor may be considered to be a dual function susceptor. The open-porous structure of the ceramic material allows all or nearly all of the susceptor material to be homogenously soaked with aerosol-forming liquid. Therefore, the susceptor is in direct contact with aerosol-forming liquid. At the same time, the entire volume of the susceptor is homogenously heatable under the influence of an alternating electromagnetic field. The susceptor allows for homogeneously heating the entire portion of the aerosol-forming liquid stored therein without the need to overheat. Furthermore, the susceptor ensures consistent vaping because the quantity of aerosol-forming liquid which may be heated is related to the porosity and the overall volume of the susceptor which are well controllable parameters.

The open porosity of susceptor provides high retention capacity for liquid aerosol-forming material. Therefore, liquid aerosol-forming material is safely held or retained in the susceptor so as to substantially reduce the risk of spill, for example as compared to a liquid tank. In particular, this allows the susceptor as well as any aerosol-generating articles, devices or system comprising such a susceptor to be substantially leak proof. In addition, the open porosity of the susceptor material allows vaporized aerosol-forming material to freely escape from the cartridge upon heating.

As used herein, the term 'susceptor' refers to an element comprising a material that is configured to convert electromagnetic energy into heat. Thus, when located in an alternating electromagnetic field, the susceptor is heated. In general, this may be the result of hysteresis losses and/or eddy currents induced in the susceptor, depending on the electrical and magnetic properties of the susceptor material. Hysteresis losses occur in ferromagnetic or ferrimagnetic susceptor materials due to magnetic domains within the material being switched under the influence of an alternating electromagnetic field. Eddy currents may be induced if the susceptor material is electrically conductive. In case of an electrically conductive ferromagnetic or ferrimagnetic susceptor material, heat can be generated due to both, eddy currents and hysteresis losses. Accordingly, the open-porous inductively heatable ceramic material may be heatable due to at least one of hysteresis losses or eddy currents, depending on the electrical and magnetic properties of the open-porous ceramic material. Accordingly, the open-porous inductively heatable ceramic material may be electrically conductive. Alternatively or additionally, the open-porous inductively heatable ceramic material may be ferromagnetic or ferrimagnetic. The susceptor may comprise or consist of an electrically conductive ceramic material, such as lanthanum-doped strontium titanate, or yttrium-doped strontium titanate. Likewise, the susceptor may comprise or consist of an open-porous ferrimagnetic or ferromagnetic ceramic material, such as a ceramic ferrite.

As used herein, the terms 'aerosol-forming liquid' or 'vapor-forming liquid' relates to a liquid that releases volatile compounds when the aerosol-forming liquid is heated. The aerosol-forming liquid may contain both, solid and liquid aerosol-forming materials. The aerosol-forming liquid may comprise a tobacco-containing material containing volatile tobacco flavour compounds, which are released from the liquid upon heating. Alternatively or additionally, the aerosol-forming substrate may comprise a non-tobacco material. The aerosol-forming liquid may further comprise an aerosol former. Examples of suitable aerosol formers are glycerine and propylene glycol. The aerosol-forming substrate may also comprise other additives and ingredients, such as nicotine or flavourants. In particular, the aerosol-forming liquid may include water, solvents, ethanol, plant extracts and natural or artificial flavours. The aerosol-forming liquid may also be a paste-like material, a sachet of porous material comprising aerosol-forming substrate, or, for example, loose tobacco mixed with a gelling agent or sticky agent, which could include a common aerosol former such as glycerine, and then is compressed or molded into a plug.

The specific material and geometry of the susceptor can be chosen to provide a desired heat generation and liquid absorption and retention effect. In general, the susceptor may have any shape. The shape may be chosen based on the specific place of action and installation in a aerosol-generating article, device, or system. For example, the susceptor may be of one of a cylinder, a disc, a tube, a cuboid, or a washer-shaped configuration.

The susceptor may be a unitary body comprising or being made of the open-porous inductively heatable ceramic material. The unitary body may be a compact solid body, which may allow for providing a compact unitary storage medium for aerosol-forming liquid to be heated. In particular, the unitary susceptor body may be a unitary pellet or pressed article.

Alternatively, the susceptor may comprise a plurality of susceptor elements. Each susceptor element may comprise the open-porous inductively heatable ceramic material. Likewise, each susceptor element may be a unitary body, in particular a compact solid body. In at least one example embodiment, the susceptor may be a solid bulk material of individual susceptor elements, such as individual susceptor pellets. The susceptor may be a susceptor granulate.

In at least one example embodiment, the quantity of aerosol-forming liquid which is held and heated by the susceptor is a related to porosity of the open-porous ceramic material. In at least one example embodiment, the open-porous inductively heatable ceramic material has a porosity ranging from about 20% to about 60%. The porosity may be chosen such that the susceptor holds a desired (or, alternatively predetermined) amount of aerosol-forming liquid. The desired (or, alternatively predetermined) amount of liquid corresponds to a desired (or, alternatively predetermined) number of puffs to be available when using the susceptor with an aerosol-generating device or system. The porosity may also be chosen with regard to a specific air-flow management through the susceptor. In at least one example embodiment, the porosity may be chosen such as to provide a specific resistance-to-draw (RTD).

In at least one example embodiment, heating of the aerosol-forming liquid is based on hysteresis losses only. Therefore, heating of the susceptor, that is, heating of the open-porous inductively heatable ceramic material, mainly or even exclusively may result from hysteresis losses. Therefore, the open-porous ceramic material is ferrimagnetic or ferromagnetic only. Accordingly, the open-porous inductively heatable ceramic material is electrically non-conductive or—if at all—only a very weakly conductive. As will be described in more detail below, this may limit the heatability of the susceptor to a temperature corresponding to the Curie temperature of the susceptor material. In an electrically non-conductive material, eddy currents and thus heating due to eddy currents do not occur.

Ferrimagnetic materials and ferromagnetic materials may hold a spontaneous magnetization below the Curie temperature, and show no magnetic order above this temperature. Therefore, above its Curie temperature ferrimagnetic or ferromagnetic materials are paramagnetic and thus heating due to hysteresis losses no longer occurs. Thus, in case the open-porous ceramic material of the susceptor is electrically non-conductive, but ferrimagnetic or ferromagnetic only, the inductive heatability even completely disappears above the Curie temperature. This effect may be used to control the heating temperature of the susceptor. In at least one example embodiment, the open-porous inductively heatable ceramic material of the susceptor may have a Curie temperature chosen such as to correspond to an increased or maximum temperature to which the susceptor should be heated in order to avoid or at least reduce the possibility of rapid overheating. The Curie temperature may deviate from this maximum temperature by about 1% to about 3%. The inductively heatable ceramic material of the susceptor may be selected to have a Curie temperature lower than about 400° C., lower than about 380° C., or lower than about 360° C. In at least one example embodiment, the inductively heatable ceramic material has a Curie temperature ranging from about 150° C. to about 300° C. This holds in particular for those susceptors comprising only one single ferrimagnetic ceramic material.

As mentioned above, the open-porous inductively heatable ceramic material is a ceramic ferrite. As used herein, ferrites are ferrimagnetic ceramic compounds derived from iron oxides such as hematite ($Fe_2O_3$) or magnetite ($Fe_3O_4$) as well as oxides of other metals. Usually, ferrites are electrically non-conductive.

In at least one example embodiment, the open-porous inductively heatable ceramic material may comprise or may be at least one of: a manganese-magnesium ferrite, a nickel-zinc ferrite, or a cobalt-zinc barium ferrite.

The nickel-zinc ferrite may comprise or may consist of a composition of the type $Mg_x Mn_yFe_zO_4$, wherein x=0.4–1.1, y=0.3–0.9, and z=1–2, and wherein the atomic fraction x, y and z of the metallic cations Mg, Mn and Fe is such that the total charge of the metallic cations equilibrates the total charge of the oxygen anions. The open-porous inductively heatable ceramic material may comprise or may be one of: $Mg_{0.77}$ $Mn_{0.58}$ $Fe_{1.65}$ $O_4$, having a Curie temperature of about 270° C., $Mg_{0.55}$ $Mn_{0.88}$ $Fe_{1.55}$ $O_4$; having a Curie temperature of about 262° C., or $Mg_{1.03}$ $Mn_{0.35}$ $Fe_{1.37}$ $O_4$; having a Curie temperature of about 190° C.

The nickel-zinc ferrite may comprise or may consist of a composition of the type Nix $Zn_{1-x}FE_2O_4$, wherein x=0.3–0.7 and the atomic fraction of the metallic cations Ni, Zn and Fe is such that the total charge of the metallic cations equilibrates the total charge of the oxygen anions. In at least one example embodiment, the open-porous inductively heatable ceramic material may comprise or may be for example $Ni_{0.5}$ $Zn_{0.5}$ $Fe_2$ $O_4$, having a Curie temperature of about 258° C.

The cobalt-zinc barium ferrite may comprise or may consist of $Co_{1.75}Zn_{0.25}Ba_2Fe_{12}$ $O_{22}$, having a Curie temperature of about 279° C.

A method for producing a susceptor comprising an open-porous inductively heatable ceramic material may include mixing powdered raw components of the ceramic material, dissolving cellulose into a solvent, mixing the dissolved cellulose with the mixed raw components to get a slurry mixture, drying the slurry mixture, pressing the dried mixture to form a pellet of desired shape, calcinating the pellet to form an open-porous pellet, and annealing the open-porous pellet.

The mixing the powdered raw components of the ceramic material and mixing the dissolved cellulose with the mixed raw components may be combined. The raw components of the ceramic material and the dissolved cellulose may be mixed together in a single step.

Instead of using a solvent, processing of the cellulose and the powdered raw materials may alternatively be done in dry condition. Therefore, an alternative method for producing a susceptor comprising an open-porous inductively heatable ceramic material may comprise mixing powdered raw components of the ceramic material and cellulose to get a dry mixture, pressing the dry mixture to form a pellet of desired shape, calcinating the pellet to form an open-porous pellet, and annealing the open-porous pellet.

As used herein, ‘calcinating’ is a thermal treatment process in an air or oxygen atmosphere at a temperature ranging from about 550° C. to about 1300° C. Calcination may be performed in a calciner. A calciner may be a steel cylinder that rotates inside a heated furnace and performs indirect high-temperature processing within a controlled atmosphere. With regard to the ceramic material, calcination aims to combust the cellulose and—if present—to remove the solvent. During this process, the desired open-porous structure of the ceramic material is formed. The pellet is calcinated at a temperature of about 1200° C.

The cellulose has two functions. First, the cellulose acts as binder between the particles of the mixed raw components in the pellet. Second, the cellulose particles act as displacement bodies to form the open-porous structure.

The pressure applied to the dried mixture to form a pellet of desired shape may be in a range of 5–10 $t/cm^2$ (tons per square centimetre). In at least one example embodiment, a load of about 10 tons may be applied to a circular sample having a diameter or about 13 mm.

The open-porous pellet is annealed at a temperature in the range of about 500° C. to about 700° C. In at least one example embodiment, the open-porous pellet is annealed at a temperature of about 600° C.

Prior to the mixing of the powdered raw components, the method may further comprise the step of sieving the raw components of the ceramic material to select powder particles of the raw components having a specific grain size in a desired range. In at least one example embodiment, the specific grain size ranges from about 50 μm to about 80 μm.

The method may further comprise the step of milling the raw components prior to the mixing the raw components, and—if provided—prior to sieving the raw components.

After the step of milling, the method may further comprise drying the milled raw components prior to the mixing the raw components, and—if provided—prior to sieving the raw components.

In at least one example embodiment, the susceptor may be part of or may be a consumable aerosol-generating article which is pre-soaked with an aerosol-forming liquid so as to be ready for use with an aerosol-generating device including an induction source. Therefore, the susceptor may further comprise an aerosol-forming liquid held in the open-porous inductively heatable ceramic material. The susceptor may comprise an open-porous inductively heatable ceramic material which holds an aerosol-forming liquid or which is (pre-) soaked with an aerosol-forming liquid. In at least one example embodiment, the open-porous inductively heatable ceramic material may hold or may be (pre-) soaked with a desired (or, alternatively predetermined) amount of an aerosol-forming liquid. The desired (or, alternatively predetermined) amount of liquid corresponds to a number of puffs to be available when vaping the susceptor with an aerosol-generating device.

In at least one example embodiment, the susceptor may be integral part of an aerosol-generating device. An aerosol-generating device for generating an aerosol by inductively heating an aerosol-forming liquid comprises an induction source comprising an induction coil for generating an alternating electromagnetic field. Furthermore, the device comprises a susceptor that includes an open-porous inductively heatable ceramic material configured to hold and heat an aerosol-forming liquid. The susceptor is positioned relative to the induction coil so as to be inductively heatable by the alternating electromagnetic field in operation of the device.

For generating the alternating electromagnetic field, the induction source may comprise an alternating current (AC) generator. The AC generator may be powered by a power supply of the aerosol-generating device. The AC generator is operatively coupled to the induction coil. The AC generator is configured to generate a high frequency oscillating current to be passed through the induction coil for generating an alternating electromagnetic field. As used herein, a high frequency oscillating current means an oscillating current having a frequency ranging from about 500 kHz to about 30 MHz, ranging from about 1 MHz to about 10 MHz, or ranging from about 5 MHz to about 7 MHz.

The device may further comprise an electric circuitry which includes the AC generator. The electric circuitry may comprise a DC/AC inverter, which may include a Class-D or Class-E power amplifier. The electric circuitry may be connected to an electrical power supply of the aerosol-generating device. The electric circuitry may comprise a microprocessor, which may be a programmable microprocessor, a microcontroller, or an application specific integrated chip (ASIC) or other electronic circuitry capable of providing control. The electric circuitry may comprise further electronic components. The electric circuitry may be configured to regulate a supply of current to the induction coil. Current may be supplied to the induction coil continuously following activation of the system or may be supplied intermittently, such as on a puff by puff basis.

The aerosol-generating device comprises a power supply, such as a battery. The battery may be a lithium iron phosphate battery. As an alternative, the power supply may be another form of charge storage device such as a capacitor. The power supply may require recharging and may have a capacity that allows for the storage of enough energy for one or more user experiences. In at least one example embodiment, the power supply may have sufficient capacity to allow for the continuous generation of aerosol for a period of about six minutes or for a period that is a multiple of six minutes. In at least one example embodiment, the power supply may have sufficient capacity to allow for a desired (or, alternatively predetermined) number of puffs or discrete activations of the induction coil.

The device may comprise a single induction coil or a plurality of induction coils. The number of induction coils may depend on the number of susceptor elements. The induction coil or coils may have a shape matching the shape of the susceptor. Likewise, the induction coil or coils may have a shape to conform to a shape of a housing of the aerosol-generating device. For example, the induction coil or coils may be a helical coil or flat spiral coil. The induction coil may be wound around a ferrite core. As used herein a ‘flat spiral coil’ means a coil that is generally planar coil wherein the axis of winding of the coil is normal to the surface in which the coil lies. The flat spiral induction can have any desired shape within the plane of the coil. For example, the flat spiral coil may have a circular shape or may have a generally oblong or rectangular shape. However, the term ‘flat spiral coil’ as used herein covers coils that are planar as well as flat spiral coils that are shaped to conform to a curved surface. The use of a flat spiral coil allows for designing a compact device, having a simple design that is robust and inexpensive to manufacture. The coil can be held within a housing of the device and need not to be exposed to generated aerosol so that deposits on the coil and possible corrosion can be prevented. The induction coil may be covered by a corrosion resistant coating or enclosure. The induction coil may have a diameter ranging from about 5 mm to about 10 mm. The induction coil may be positioned on or adjacent a surface of cavity closest to the power supply. This reduces the amount and complexity of electrical connections within the device.

In at least one example embodiment, the susceptor should be close to the induction coil so as to ensure that the alternating electromagnetic field permeates the open-porous inductively heatable ceramic material. The susceptor is positioned in the vicinity of the induction coil. The distance between the induction coil and the susceptor is substantially constant across the extent of the susceptor as to ensure homogenous heating. The distance between the susceptor and the induction coil may be below 2 mm, below 1 mm, or even below 0.5 mm.

The aerosol-generating device may comprise a device housing. The device housing may comprise the susceptor, the induction source, the induction coil, the AC generator, the electric circuitry, and the power supply. As will be further described below, the device housing may further comprise a tank or a liquid retention element, or both, for storing aerosol-forming liquid.

The device housing may further comprise a cavity in which the susceptor may be at least partially arranged. The cavity may have an internal surface. The induction coil may be positioned on or adjacent a surface of the cavity closest to the power supply. The induction coil may be shaped to conform to the internal surface of the cavity. In at least one example embodiment, the induction coil may be within the cavity. In at least one example embodiment, the cavity may be an aerosol-generating chamber.

The device housing may comprise a main body and a mouthpiece portion. The cavity may be in the main body and the mouthpiece portion may have an outlet through which aerosol generated by the device can be drawn out. The induction coil may be arranged in the main body, in the mouthpiece portion, or in both, the main body and the mouthpiece portion. As used herein, the term ‘mouthpiece portion’ means a portion of the device through which the vapor is conveyed.

The device may comprise an air path extending from at least one air inlet to at least one air outlet. The air outlet is an outlet of a mouthpiece. The air path passes the susceptor, in particular an external surface of the open-porous ceramic material. The air path may go through the cavity. The air path may also pass the induction coil. By allowing the air flow through the device to pass through the coil a compact system can be achieved. The induction coil may be positioned adjacent to the susceptor. The air path may include an airflow passage provided between the induction coil and the susceptor element. Vaporized aerosol-forming material may be entrained in the air flowing in the airflow passage, which subsequently cools to form an aerosol that escapes through the air outlet.

The open-porous ceramic material of the susceptor may be (pre-)soaked with a desired (or, alternatively predetermined) amount of an aerosol-forming liquid, for example for a single use of the device. Yet, multiple use of the device and the susceptor integrated therein may be achieved. Therefore, the device may be configured for repeatedly or continuously soaking the susceptor with aerosol-forming liquid. The aerosol-generating device may further comprise a tank for holding or storing aerosol-forming liquid. The tank may be replaceable or refillable. The tank may be arranged within a housing of the device, in particular within the main body of the device. For (re-soaking) the susceptor with aerosol-forming liquid the tank is in fluid communication with the susceptor, for example via a fluid channel or a fluid pipe.

Transfer of aerosol-forming liquid from the tank to the susceptor preferably occurs due to gravity. Alternatively, the liquid transfer may occur due to capillary effects, such as via a capillary wick element between the tank and the susceptor. The aerosol-generating device may also comprise a pumping device, such as a micro-pump, for transferring aerosol-forming liquid from the tank to the susceptor.

In at least one example embodiment, the aerosol-generating device may be configured such that soaking of the susceptor with aerosol-forming liquid from the tank only occurs in a specific position of the device, for example an up-down or an overhead position of the device. As used herein, position of the device primarily refers to the orientation of the device in space, in particular with regard to gravity. In other words, the aerosol-generating device may be configured such that soaking of the susceptor with aerosol-forming liquid from the tank requires orientating the device into a specific position. The specific position may be denoted as 'soaking position', which reduces unwanted soaking or even oversoaking of the susceptor beyond its capacity.

The aerosol-generating device may be configured such that transfer of aerosol-forming liquid from the tank to the susceptor occurs due to gravity only. In at least one example embodiment, the relative arrangement between the susceptor and the tank may be such that in a specific soaking position of the device, the susceptor is arranged at a level below a level of the tank. In contrast, in an operation position of the device, that is, during aerosol generation, the susceptor is arranged at a level above a level of the tank. Accordingly, there is no transfer of aerosol-forming liquid from the tank to the susceptor in the operation position. If at all, excess aerosol-forming liquid may reflow in the operation position from the susceptor or the fluid channel/fluid pipe into the tank.

Alternatively or in addition, the fluid communication between the susceptor and the tank is interruptible or releasable. In particular, the aerosol-generating device may be configured such that the tank is in fluid communication with the susceptor only in a specific soaking position of the device. At least in the operation position of the device, but also in any position other than the soaking position, the fluid communication may be disabled, released, interrupted or shut-off. For realizing an interruptible or releasable fluid communication, the aerosol-generating device may comprise a valve for controlling the fluid communication between the tank and the susceptor. The valve may be a gravity-actuated valve that is open only in a specific position of the device, such as an up-down or an overhead position of the device. The valve may be a controllable electromagnetic valve. The electromagnetic valve may be manually controllable, for example by a switch. Alternatively, the electromagnetic valve may be coupled to an electric circuitry of the aerosol-generating device for controlling the shutting-off and opening of the valve. The electric circuitry may further comprise a position sensor, such as a microchip-packaged MEMS gyroscope, for determining the position of the aerosol-generating device. Accordingly, the electric circuitry may be configured to open the electromagnetic valve only in case the position sensor detects that the aerosol-generating device is in a specific position. In case the position sensor detects any other position, the valve is closed by the electric circuitry.

The aerosol-generating device may be further configured such that heating of the susceptor is disabled during soaking of the susceptor with aerosol-forming liquid so as to reduce and/or prevent unintentional gas formation in the tank.

The aerosol-generating device may be configured such that an aerosol passage towards an aerosol output of the aerosol-generating device is closed during soaking of the susceptor with aerosol-forming liquid.

Due to the open-porous structure of the ceramic material, the susceptor already provides high liquid retention capacity. Nevertheless, the aerosol-generating device may further comprise a liquid retention element for holding additional aerosol-forming liquid. The liquid retention element may comprise a high retention or high release material (HRM) for storing liquid aerosol-forming substrate. The liquid retention element may be a storage medium for aerosol-forming liquid to soak the susceptor with. The liquid retention element is in direct contact with the susceptor. Thus, aerosol-forming liquid stored in the liquid retention element may be easily transferred to the susceptor, for example by capillary action. Aerosol-forming liquid retained in the liquid retention element is not available for aerosolization before having left the retention element. The liquid retention element may be electrically non-conductive. The liquid retention element may also be paramagnetic or diamagnetic. In at least one example embodiment, the liquid retention element may be inductively non-heatable. The liquid retention element may be arranged with the aerosol-generating device such as to be unaffected or only minimally affected by the alternating electromagnetic field of the induction coil.

The aerosol-generating device may comprise both, a liquid retention element and a tank for aerosol-forming liquid. In at least one example embodiment, the tank is in fluid communication with the liquid retention element, which in turn may be in fluid communication with the susceptor. Thus, the liquid retention element is (re-)filled from the tank, whereas the susceptor is soaked from the liquid retention element.

As mentioned above, the susceptor may be part of or may be a consumable aerosol-generating article which is pre-soaked with an aerosol-forming liquid such as to be ready for use with an aerosol-generating device that includes an induction source. In at least one example embodiment, the aerosol-generating article may be part of or may be a cartridge for use with an aerosol-generating device. The cartridge comprises an aerosol-forming liquid and an inductively heatable susceptor as described herein. The susceptor comprises or is made of or consists of an open-porous inductively heatable ceramic material as described herein which holds at least a portion of the aerosol-forming liquid contained in the cartridge. In addition to holding at least a portion of the aerosol-forming liquid, the inductively heatable ceramic material allows for inductively heating the aerosol-forming liquid held therein under the influence of an alternating electromagnetic field The cartridge is a consumable, in particular disposable aerosol-generating article. It is configured to be received in a cavity of an aerosol-generating device which in turn comprises an induction source for inductively heating the susceptor of the cartridge when it is received in the cavity. In operation, the induction source generates an alternating magnetic field that permeates the susceptor of the cartridge received in the cavity. Depending on the electrical and magnetic properties of the inductively heatable ceramic material, the alternating magnetic field causes at least one of eddy currents or hysteresis losses in the susceptor. Consequently, the susceptor heats up causing the aerosol-forming liquid held therein to be vaporized. Due to the open-porous structure of the ceramic material, the vaporized aerosol-forming liquid can pass through the susceptor and subsequently cool to form an aerosol.

In at least one example embodiment, the susceptor holding the aerosol-forming liquid may essentially constitute the cartridge, that is, the consumable aerosol-generating article. In this case, the susceptor may hold the entire aerosol-forming liquid of the cartridge. In other words, the cartridge may only consist of the susceptor soaked with aerosol-forming liquid.

In addition, the cartridge may comprise a cartridge housing surrounding the soaked susceptor at least partially. In at least one example embodiment, the cartridge housing surrounds the susceptor completely, that is, the susceptor may be within the cartridge housing.

When the cartridge housing is to be received in a cavity of an aerosol-generating device, the housing is electrically non-conductive.

The susceptor may fill at least a portion of an interior space of the cartridge housing.

The cartridge housing may be at least partially or completely removable such as to at least partially or completely free the susceptor. In operation, this allows the vaporized aerosol-forming liquid to freely escape from the cartridge, and vice versa, to let air enter into the susceptor. If the cartridge constitutes a consumable aerosol-generating article essentially consisting of the susceptor soaked with aerosol-forming liquid, the cartridge housing may be an envelope or a cover of the susceptor which can be at least partially or completely removed prior to engaging the cartridge with an aerosol-generating device, that is prior to engaging the partially or completely freed susceptor with an aerosol-generating device.

The cartridge housing may comprise at least one fluid permeable portion. As used herein a 'fluid permeable portion' is a portion of the cartridge housing allowing gas and/or liquid to permeate there through. In at least one example embodiment, the at least one fluid permeable portion of the cartridge housing allows the aerosol-forming liquid, in either gaseous phase or both gaseous and liquid phase, to permeate through it. The cartridge housing may have a plurality of fluid permeable portions. In at least one example embodiment, at least a part of those portions of the cartridge housing covering the susceptor or being in contact with the susceptor may be fluid permeable. Even the entire cartridge housing may be fluid permeable.

Due to the high retention capacity of the susceptor material, the susceptor itself may also form at least a portion of the cartridge housing. The susceptor may even form the complete cartridge housing. As an example, the cartridge may be a hollow cylinder comprising a circumferential wall and two end walls. The circumferential wall and the end walls form a housing of the cartridge. At least one end wall or at least a portion of the circumferential wall, or both, may be formed by the susceptor.

The susceptor may only partially fill the volume of the cartridge housing. In at least one example embodiment, the void interior volume of the cartridge may be used as tank or reservoir filled with aerosol-forming liquid. A portion of the surface of the susceptor facing the interior of the cartridge may be in direct contact with the aerosol-forming liquid. Thus, when heated aerosol-forming liquid held in the susceptor is vaporized and released from the cartridge through the open-porous structure of the ceramic susceptor material. At the same time, the susceptor is continuously re-filled or re-soaked by aerosol-forming liquid stored in the cartridge tank or reservoir. As compared to a cartridge in which the susceptor completely fills the cartridge volume, a cartridge having a void volume filled with aerosol-forming liquid has a larger operation time. This is due to the fact that the liquid storage capacity of the susceptor volume is lower as compared to a free volume of equal size.

The overall surface corresponding to the outer contour of the susceptor body present on the outer surface of the cartridge may amount to about 25 $mm^2$.

According to at least one example embodiment there is also provided an aerosol-generating system for generating an aerosol by inductively heating an aerosol-forming liquid. The system comprises an aerosol-generating device and a cartridge as described herein. Accordingly, the cartridge comprises an aerosol-forming liquid and an inductively heatable susceptor which holds at least a portion of the aerosol-forming liquid. The cartridge is configured to be used with the aerosol-generating device, that is, to be engaged with the aerosol-generating device for generating an aerosol by inductively heating the aerosol-forming liquid contained in the cartridge. For this, the aerosol-generating device comprises a device housing including a cavity for receiving at least a portion of the cartridge. The aerosol-generating device further comprises an induction source within the device housing comprising an induction coil for generating an alternating electromagnetic field. The aerosol-generating device and the cartridge are configured such that upon receiving the cartridge in the cavity the susceptor is positioned relative to the induction coil so as to be inductively heatable by the alternating electromagnetic field.

The induction coil may be positioned on or adjacent an internal surface of the cavity. The induction coil may be shaped to conform to the internal surface of the cavity. Alternatively, the induction coil may be within the cavity. In at least one example embodiment, the induction coil may be within an internal passage of the cartridge when the cartridge is engaged with the device.

The device housing may comprise a main body and a mouthpiece portion. The cavity may be in the main body and the mouthpiece portion may have an outlet through which aerosol generated by the system exits the device. The induction coil may be in the mouthpiece portion or in the main body. In at least one example embodiment, a mouthpiece portion may be provided as part of the cartridge.

The device may comprise an air path extending from at least one air inlet to at least one air outlet. The air outlet is an outlet of a mouthpiece. The air path passes the susceptor, in particular an external surface of the open-porous ceramic material. The air path may go through the cavity. The air path may also pass the induction coil. By allowing the air flow through the device to pass through the coil a compact system can be achieved. During vaping, the induction coil may be positioned adjacent to the susceptor when the cartridge is engaged with the device and/or received in the cavity. The air path may include an airflow passage provided between the induction coil and the susceptor element when the cartridge is received in the cavity. Vaporized aerosol-forming material may be entrained in the air flowing in the airflow passage, which subsequently cools to form an aerosol and may be escape through the air outlet.

In at least one example embodiment, as compared to the aerosol-generating device described above, the aerosol-generating device described here does neither comprise an internal susceptor nor an internal reservoir for aerosol-forming liquid, such as a liquid tank. However, apart from that, the aerosol-generating device described here may be similar or identical to the aerosol-generating device described above.

In at least one example embodiment, the induction source and the induction coil of the aerosol-generating device described here may be similar or identical to the induction source and the induction coil of the aerosol-generating device described above. Likewise, the aerosol-generating device described here may also comprise at least one of an AC generator, an electric circuitry, and a power supply as described above.

FIG. 1 is a schematic illustration of an aerosol-generating system 1 in accordance with at least one example embodiment. In at least one example embodiment, the system comprises an aerosol-generating device 100 and a cartridge 200 that is engageable with the aerosol-generating device 100. The device 100 comprises a main body having a main body housing 101 which contains a lithium ion battery as power supply 102, and an electric control circuitry 104. The main body housing 101 defines a cavity 112 in which the cartridge 200 is received. The device 100 also includes a mouthpiece portion 120 comprising an outlet 124. A housing of the mouthpiece portion 120 and the main body housing 101 together form the housing of the device 100. The mouthpiece portion may be connected to the main body by any kind of connection, such as by a hinged connection, a snap fitting, or a screw fitting. Air inlets 122 are defined in the main body housing 101.

Figure 2:
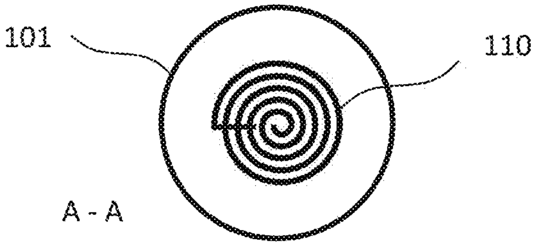
FIG. 2 shows a sectional view of the aerosol-generating system according to FIG. 1 along line A-A.

A flat spiral induction coil 110 is arranged within the cavity 112. The coil 110 is operatively connected to the control circuitry 104. The coil 110 is also illustrated in FIG. 2. The coil 110 is formed by stamping or cutting a spiral coil from a sheet of copper. The coil 110 is positioned close to an inner surface of the cavity 112, opposite to an end surface of the cartridge 200, at the level of the air inlets 122. Thus, air drawn through the inlets 122 towards to the outlet 124 passes through a passage way formed between the coil 112 and the end surface of the cylindrical cartridge 200. A flat spiral coil allows for a simple interface between the device and the cartridge, which in turn allows for a simple and inexpensive cartridge design.

Figure 4:
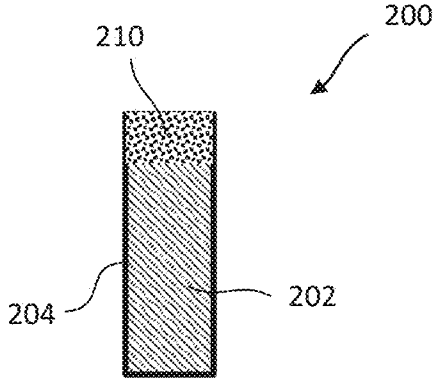
FIG. 4 schematically illustrates a cartridge in accordance with at least one example embodiment.
Figure 5:
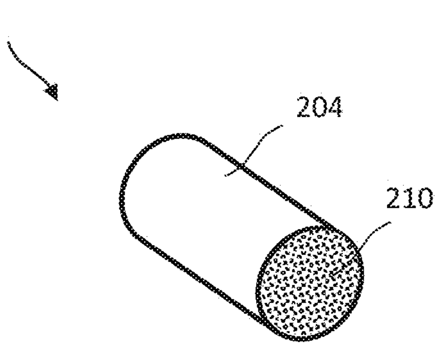
FIG. 5 shows a perspective view of the cartridge of FIG. 4 according to at least one example embodiment.

In at least one example embodiment, the cartridge 200 is of circular cylindrical shape. The cylindrical cartridge 200 comprises a cartridge housing 204 containing an aerosol-forming liquid 202. The aerosol-forming liquid may be held by a capillary material. The cartridge housing 204 is fluid impermeable, but has an open end covered by a susceptor 210. Further details of the cartridge 200 are illustrated in FIG. 4 and FIG. 5. In at least one example embodiment, the susceptor 210 is a compact solid susceptor body made of an open-porous ferrimagnetic ceramic material, for example $Ni_{0.5}$ $Zn_{0.5}$ $Fe_2$ $O_4$. The susceptor body 210 is of cylindrical shape and inserted into the open end of the cartridge housing 204. Thus, the susceptor 210 forms at least a portion of the cartridge housing 204. The cylindrical susceptor body 210 has an axial length ranging from about 3 mm to about 6 mm, or about 4 mm to about 5 mm. The overall surface corresponding to the cylindrical outer contour of the susceptor body 21 may amount to about 25 $mm^2$.

An inner end surface of the cylindrical susceptor body 210 faces the interior of the cartridge housing 204 so as to be in direct contact with the aerosol-forming liquid 202 contained in the cartridge 200. Due to the open-porous structure of the ceramic material, the susceptor is soaked with a portion of the aerosol-forming liquid 202. Accordingly, the susceptor 210 holds a least of portion of the aerosol-forming liquid 202 contained in the cartridge 200. An outer end surface of the cylindrical susceptor body 210 forms an outer surface of the cartridge 200. Thus, when heated aerosol-forming liquid held in the susceptor is vaporized and may freely escape from the cartridge 200 via the outer end surface of the open-porous susceptor body 210.

The open-porous structure has a high retention capacity for liquid aerosol-forming material. Due to this, aerosol-forming liquid is safely held or retained in the susceptor 210. This allows the cartridge 200 to be substantially leak proof with regard to the aerosol-forming liquid 202 contained therein, even though a portion of the cartridge housing is made of an open-porous material. Vice versa, the open porosity of the susceptor material is such as to allow vaporized aerosol-forming material to be freely released from the cartridge upon heating.

When the cartridge 200 is engaged with the aerosol-generating device 100 and received in the cavity 112, the susceptor element 210 is positioned adjacent the flat spiral coil 110. The cartridge 200 may include keying features to ensure that the cartridge 200 is not inserted into the device 100 upside-down.

During vaping, an adult vaper may puff on the mouthpiece portion 120 to draw air though the air inlets 122 into the cavity 112 and the mouthpiece portion 120 and out of the outlet 124. The device may include a puff sensor 106 in the form of a microphone that is configured to sense when an adult vaper puffs on the mouthpiece. The puff sensor 106 may be part of the control circuitry 104. The puff sensor 106 may be arranged within the cavity close to the air inlets 122. When a puff is detected, the electric circuitry 104 provides a high frequency oscillating current to the coil 110. This generates an oscillating magnetic field which passes through the susceptor 210. As a consequence, the susceptor 210 heats up due to hysteresis losses and reaches a temperature sufficient to vaporize the aerosol-forming liquid held in the open pores of the susceptor material. The vaporized aerosol-forming material is entrained in the air flowing from the air inlets 122 towards the air outlet 124. Along this way, the vapor cools to form an aerosol within the mouthpiece portion 120 before escaping through the outlet 124. The control electric circuitry 104 supplies the oscillating current to the coil 110 for a predetermined duration, in this example five seconds, after detection of a puff and then switches the current off until a new puff is detected.

Figure 3:
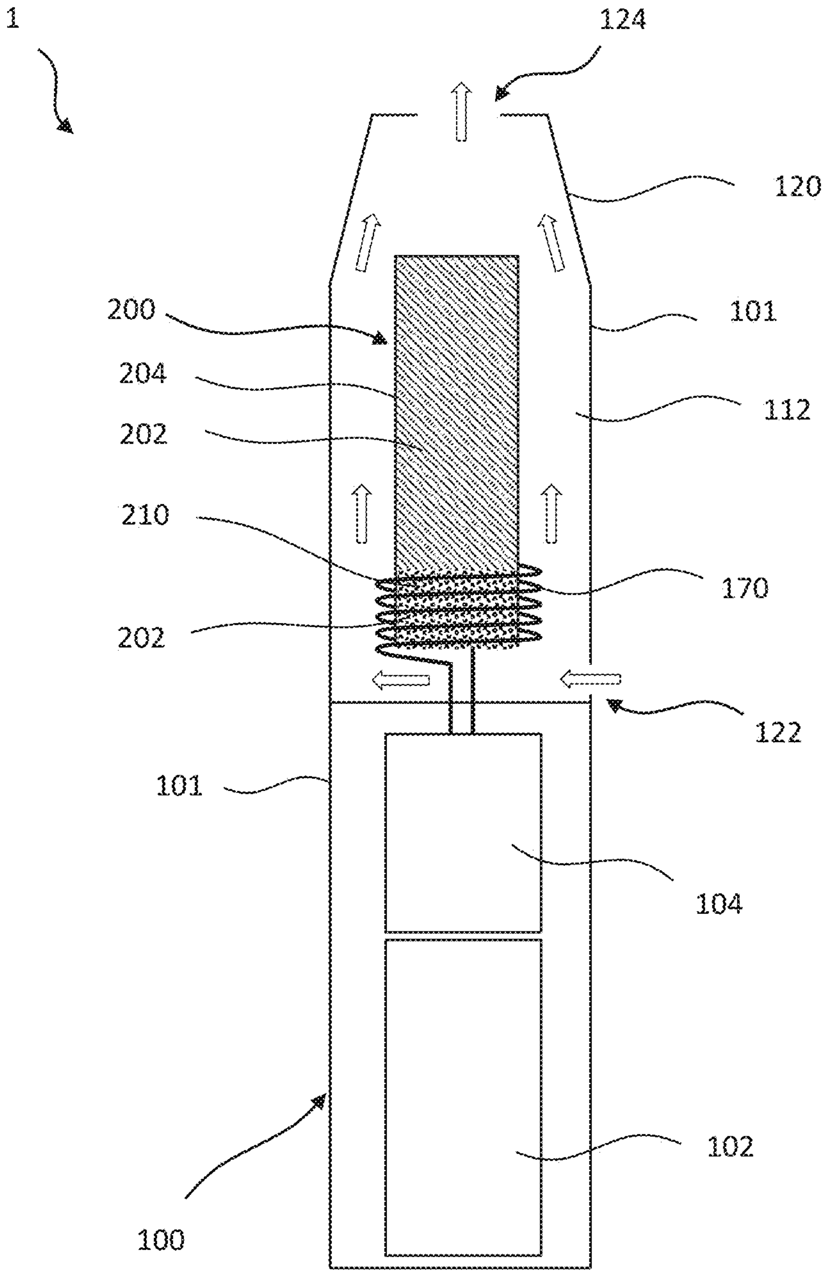
FIG. 3 schematically illustrates an aerosol-generating system in accordance with at least one example embodiment.

FIG. 3 is a schematic illustration of an aerosol-generating system 1 in accordance with a second embodiment of the invention. The system 1 comprises an aerosol-generating device 100 and a cartridge 200. Except for the induction coil, this example embodiment is identical to the example embodiment shown in FIG. 1. Therefore, in both example embodiments identical features of the aerosol-generating device and the cartridge are denoted with identical reference numerals. Instead of a flat spiral induction coil, the aerosol-generating device 100 according to the second embodiment comprises a helical induction coil 170 positioned in the cavity 112 so that the susceptor 210 is arranged within the helical induction 170 when the cartridge is received in the cavity 112. Applying a high frequency oscillating current to the coil 170 generates an oscillating magnetic field which is essentially homogenous in the interior of the helical coil 170. Thus, when the cartridge 200 is engaged with the aerosol-generating device 100, the susceptor 120 is homogeneously affected by the oscillating magnetic field which allows for substantially homogenous heating of the susceptor. In at least one example embodiment, the helical induction 170 may be also arranged on the inner surface of the cavity 112 or even within the wall of the main body housing 101, which allows for a simple and compact design of the aerosol-generating device 100.

The cartridge 200 according to the embodiment shown in FIGS. 1 to 5 has a simple and robust design, which can be inexpensively manufactured as compared to the cartomizers available on the market. However, other configurations are possible as shown in FIGS. 6 to 16.

Figure 6:
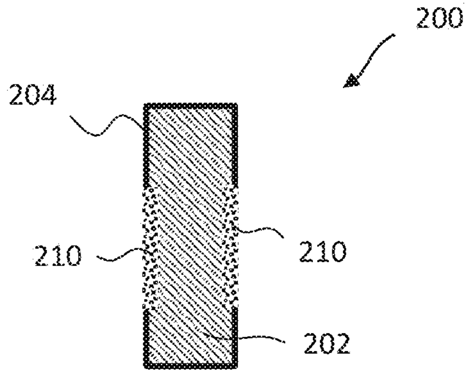
FIG. 6 schematically illustrates a cartridge in accordance with at least one example embodiment.
Figure 7:
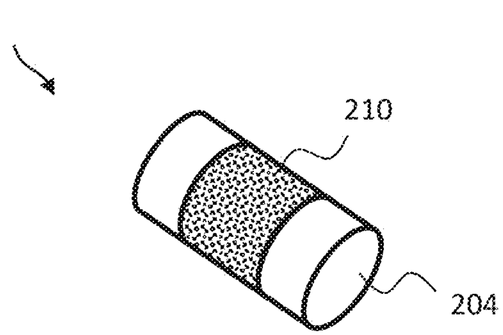
FIG. 7 shows a perspective view of the cartridge of FIG. 6 according to at least one example embodiment.

FIG. 6 and FIG. 7 schematically show an alternative cartridge design having a hollow cylindrical shape. In at least one example embodiment, the susceptor 210 is a compact susceptor body made of an open-porous ferrimagnetic ceramic material which forms a circumferential portion of a circumferential wall of the cartridge housing 204. Thus, the susceptor 210 is of tubular shape. The interior of the hollow cartridge 200 contains aerosol-forming liquid, a portion of which is held in the susceptor 210. The cartridge as shown in FIGS. 6 and 7 may be designed to engage with an aerosol-generating device comprising a helical induction coil as shown in FIG. 3. The aerosol-generating device is preferably designed such that the susceptor 210 is coaxially positioned within the interior of the helical coil when the cartridge is engaged with the aerosol-generating device. Thus, heating of the susceptor 210 may be homogenous. Furthermore, the active heating volume of the cartridge design shown in FIGS. 6 and 7 is larger as compared to the cartridge design shown in FIGS. 4 and 5.

Figure 8:
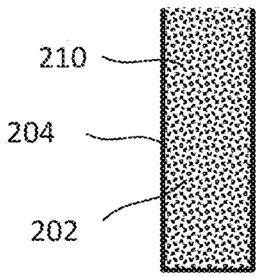
FIGS. 8-17 schematically illustrate the cartridge according at least one example embodiment.

FIG. 8 schematically shows a sectional view of another cartridge design in which the cartridge is completely filled by a susceptor 210. In this embodiment, the susceptor 210 is a compact susceptor body made of an open-porous ferrimagnetic ceramic material providing high retention for liquid aerosol-forming substrate. Therefore, the cartridge 200 may reduce the risk of spill, for example as compared to a liquid tank. In case of cracks of failures of the cartridge, the high retention material of the susceptor reduces and/or avoids unintended contact of aerosol-forming liquid with active electrical components of the device and biological tissue.

The cartridge 200 comprises a cartridge housing 204 which at least partially surrounds the susceptor 210. During vaping, vaporized aerosol-forming substrate may escape from the cartridge through those portions of the susceptor which are not covered by the cartridge housing.

Figure 9:
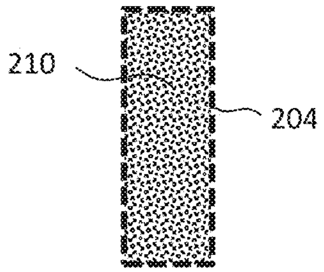

The cartridge housing 204 may also completely surround the susceptor 210. In at least one example embodiment, at least a portion of the cartridge housing 204 may be fluid permeable to allow vaporized aerosol-forming substrate to escape from the cartridge. In at least one example embodiment, the complete cartridge housing 204 is fluid permeable as shown in FIG. 9.

Figure 10:
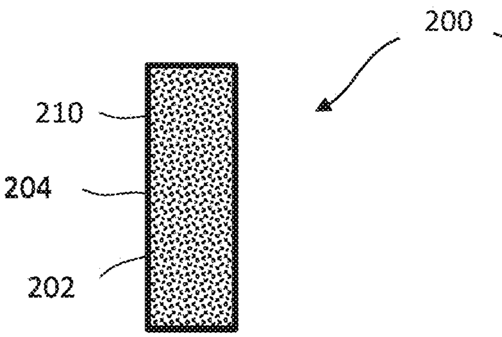

In at least one example embodiment, the susceptor 210 may be contained in an impermeable cartridge housing 204 which completely surrounds the susceptor 210 as shown in FIG. 10 so as to avoid and/or prevent the soaked susceptor from drying out.

Figure 11:
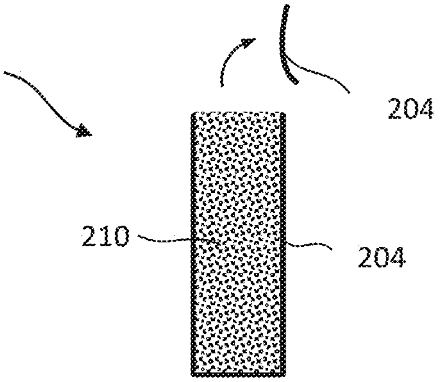

As shown in FIG. 11, at least a portion of the cartridge housing 204 may be removable or openable prior to engaging the cartridge with an aerosol-generating device, that is, prior to engaging the partially or completely freed susceptor with an aerosol-generating device. In at least one example embodiment, the cartridge housing 204 may be removable at an end face. Upon removal of the end face portion of the cartridge housing 204, the partially open cartridge may be engaged with an aerosol-generating device. During vaping, vaporized aerosol-forming substrate may escape from the cartridge via the opened end face.

Likewise, the cartridge designs according to FIGS. 4 and 5 or FIGS. 6 and 7 may comprise a cartridge housing 204 which also covers the outer surface of the susceptor 210. The portion(s) of the cartridge housing 204 which cover the susceptor are to be removed or opened prior to engaging the cartridge with an aerosol-generating device. The removable or openable portion(s) of the cartridge housing may be considered to be a protective cover of the susceptor. The outer surface susceptor may be either flush with the outer surface of the remaining portions of the cartridge housing, or recessed such that the outer surface the cartridge housing is smooth.

Figure 12:
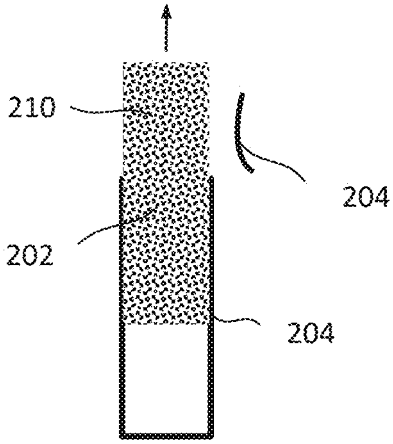
Figure 13:
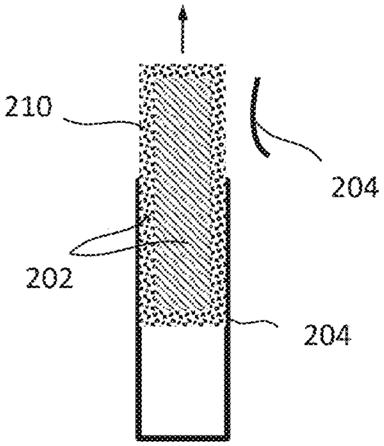

FIG. 12 and FIG. 13 schematically illustrate a another cartridge design where the complete cartridge housing 204 is a protective cover or packing sleeve that is removed before engaging the remaining parts of the cartridge with an aerosol-generating device. In at least one example embodiment as shown in FIG. 12 and FIG. 13, the susceptor body essentially constitutes the consumable aerosol-generating article to be engaged with an aerosol-generating device upon removal of a packing sleeve 204 that surrounds the article. As shown in FIGS. 12 and 13, the surrounding packing sleeve 204 may be opened at an end face, allowing the susceptor body to be taken out. With regard to the susceptor design shown in FIG. 13, the closed susceptor surface may be considered as a remaining housing of those cartridge parts which are to be engaged with an aerosol-generating device.

Figure 14:
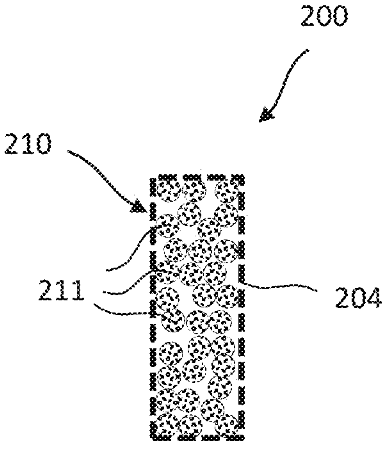

Instead of a unitary susceptor body, the susceptor 210 may also comprise a plurality of susceptor elements 210. As shown in FIG. 14, the susceptor elements 211 may be individual susceptor pellets soaked with aerosol-forming liquid forming a susceptor granulate. The susceptor elements 211 may be contained in a cartridge housing 204 at least a portion of which is fluid permeable. As example, a portion of the cartridge housing or the complete cartridge housing may be of mesh-like configuration, for example made of a stainless steel mesh. In FIG. 14, the complete cartridge housing 204 is fluid permeable. Such a cartridge housing 204 holds the individual susceptor elements together, but allows vaporized aerosol-forming substrate to escape from the cartridge.

Figure 15:
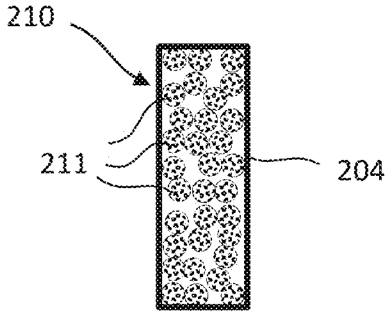

In at least one example embodiment, the susceptor elements 211 may be contained in an impermeable cartridge housing 204 as shown FIG. 15 so as to substantially prevent the soaked pellets from drying out.

Figure 16:
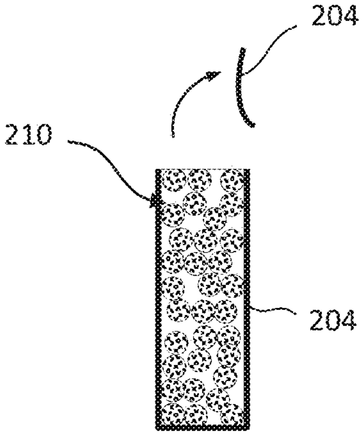
Figure 17:
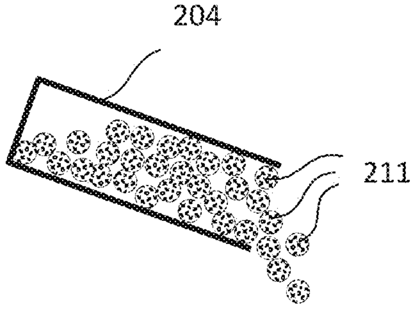

As shown in FIG. 16, at least a portion of the cartridge housing may be removable or openable such as to allow for taking out the individual susceptor elements (see FIG. 17) which may be subsequently filled into a cavity of an aerosol-generating device. If the individual susceptor elements are to be received in an aerosol-generating device as bulk material without the cartridge housing, that is as loose items, the aerosol-generating device may comprise a receptacle for receiving and securely retaining the susceptor elements in the cavity. At least a portion of the receptacle may be fluid permeable to allow vaporized aerosol-forming substrate to escape from the receptacle. The receptacle may comprise a filling port. The filling port may be closable, for example by a lid or by a mouthpiece of the aerosol-generating device.

Figure 18:
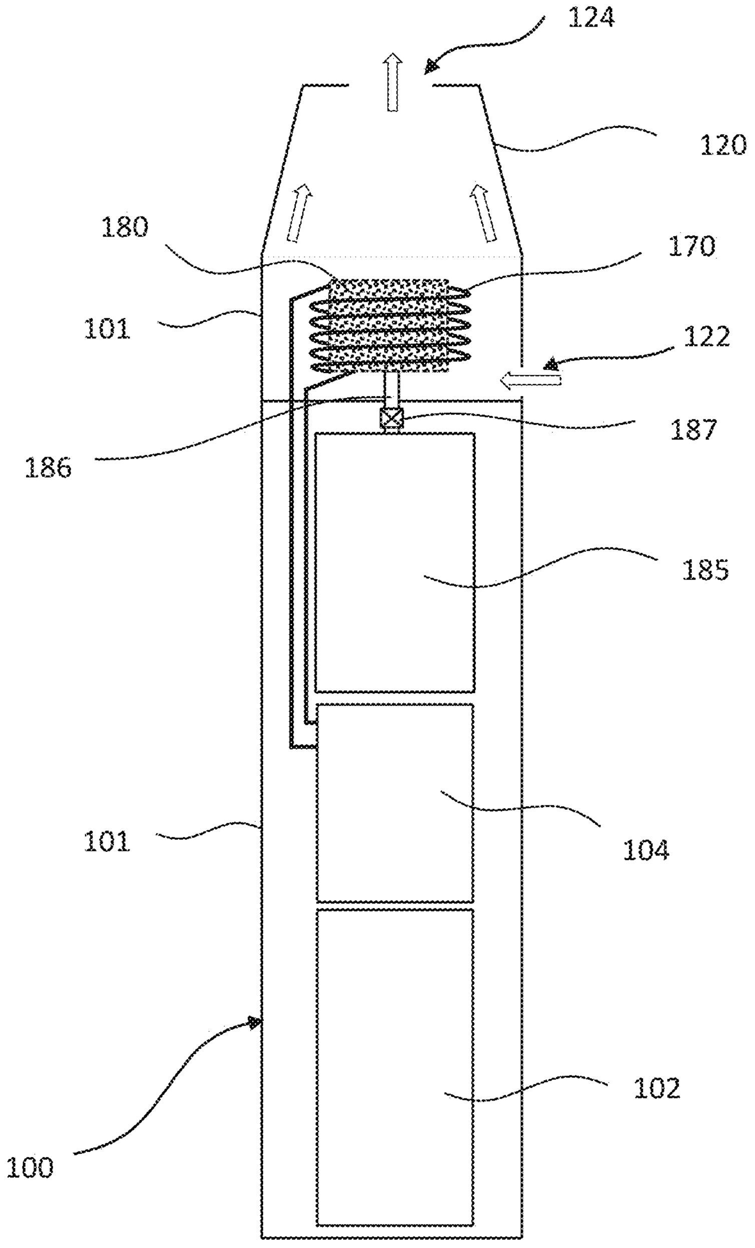
FIG. 18 schematically illustrates an aerosol-generating device in accordance with at least one example embodiment.

FIG. 18 schematically illustrates at least one example embodiment of an aerosol-generating device 100. Instead of being engageable with a separate cartridge which contains a susceptor and aerosol-forming liquid to be heated, the aerosol-generating device 100 itself comprises a susceptor 180 as described herein. The susceptor 180 is an internal susceptor 180 made of an open-porous ferrimagnetic ceramic material. Analogous to the aerosol-generating device shown in FIGS. 1 and 3, the device 100 according to FIG. 18 comprises a main body having a main body housing 101 which contains a battery 102 and a control circuitry 104. The main body housing 101 defines a cavity 112 in which the internal susceptor 180 is arranged. The device 100 also includes a mouthpiece portion 120 comprising an outlet 124. A housing of the mouthpiece portion 120 and the main body housing 101 form together the housing of the device 100. The mouthpiece portion is removably connected to the main body. Air inlets 122 are defined in the main body housing. Within the cavity 112 is a helical induction coil 170. The coil 170 is operatively connected to the control electric circuitry 104 and surrounds the cylindrical susceptor body 180. When the electric circuitry 104 provides a high frequency oscillating current to the coil 170, an oscillating magnetic field is generated which passes through the susceptor 180. As a consequence, the susceptor 180 heats up due to hysteresis losses causing vaporization of aerosol-forming liquid held in the open-porous structure of the susceptor 180. The vaporized aerosol-forming material is entrained in an air flow which builds up when a user draws air though the air inlets 122 into the cavity 112 and the mouthpiece portion 120 and out of the outlet 124.

In at least one example embodiment, the axial length extension of the helical coil 170 essentially corresponds to the axial length extension of the cylindrical susceptor 180. Of course, the coil 170 may also be configured such as to surround only an axial portion of the susceptor 180. The degree of overlap between the coil and the susceptor 180 may be used to pre-set the amount of aerosol-forming liquid to be heated and vaporized in order to optimize the user experience.

For repeatedly (re-)filling the susceptor 180 with aerosol-forming liquid, the aerosol-generating device 100 further comprises a tank 185 for aerosol-forming liquid. The tank may be replaceable or refillable. The tank 185 is arranged within the main body housing 101 of the device 100. The tank 185 is in fluid communication with the susceptor 180 via a fluid channel 186. A controllable valve 187 is arranged with the fluid channel 186. The valve 187 is operatively coupled to the control circuitry 104 for controlling the shutting-off and opening of the valve. The aerosol-generating device 100 is configured such as to open the valve 186 only in an up-down or an overhead position of the device. Thus, soaking the susceptor 180 with aerosol-forming liquid from the tank 185 requires orientating the device 100 into this specific 'soaking' position so as to reduce the risk of unwanted soaking or even oversoaking of the susceptor 180 beyond its capacity. Transfer of aerosol-forming liquid from the tank 185 to the susceptor 180 occurs due to gravity. For detecting the respective position of the device, the device 100 may comprise a position sensor (not shown) as part of the control circuitry 104. In addition, the control circuitry 104 may be configured such as to disable the heating process in the 'soaking' position in order to prevent unintended gas formation. Furthermore, the control circuitry 104 may be configured so as to block the air path toward the outlet 124 during (re-) filling of the susceptor 180 in order to reduce and/or substantially prevent unintended absorbing of aerosol-forming liquid by an adult vaper. For this, the device 100 may comprise a shutter (not shown). The device 100 may also be configured such as to enable heating of the susceptor 180 only in one or more predetermined positions of 'use'.

Figure 19:
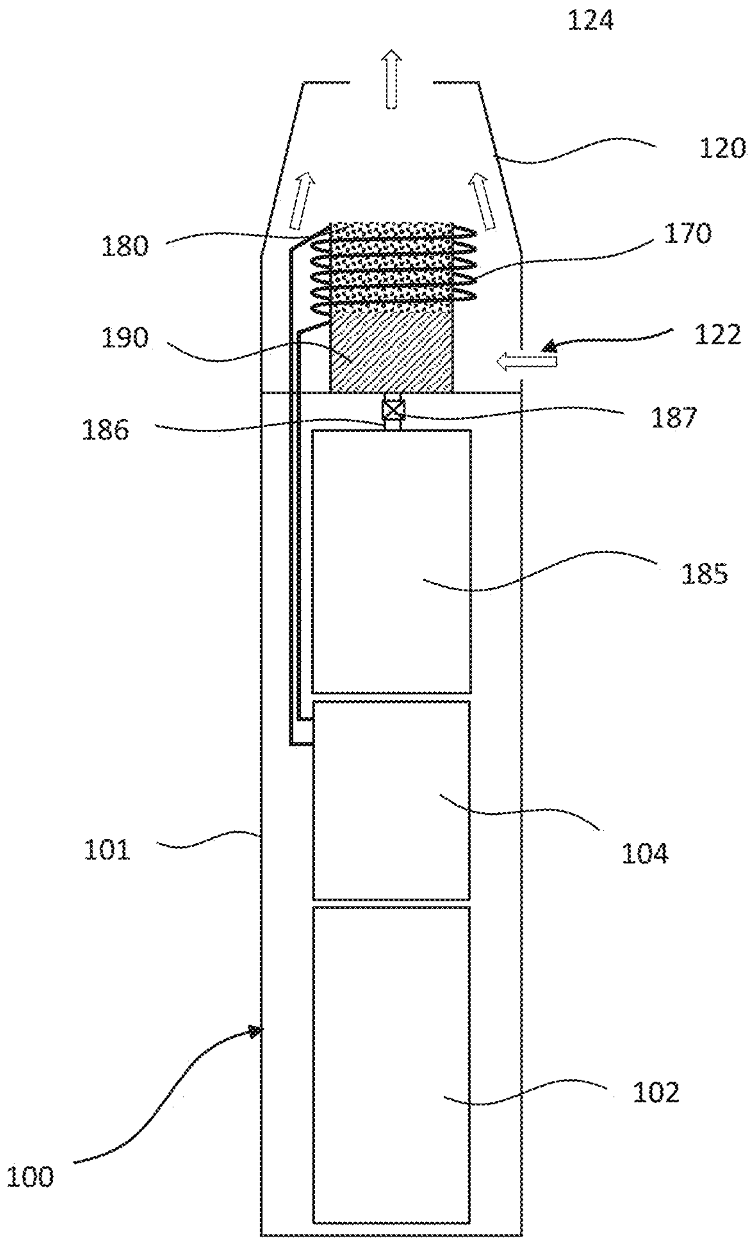
FIG. 19 schematically illustrates an aerosol-generating device in accordance with at least one example embodiment.

FIG. 19 schematically illustrates an example embodiment of an aerosol-generating device 100 comprising an internal susceptor 180. This embodiment is essentially identical to the example embodiment shown in FIG. 18. Therefore, in both example embodiments identical features of the aerosol-generating device are denoted with identical reference numerals. In addition, the device 100 according to FIG. 19 comprises a liquid retention element 190 made of a high retention or high release material (HRM). The liquid retention element 190 serves a storage medium for aerosol-forming liquid in order to continuously soak the susceptor 180. In at least one example embodiment, the liquid retention element 190 is in direct contact with the susceptor 180. Aerosol-forming liquid stored in the liquid retention element 190 is transferred by capillary action to the susceptor 180. The liquid retention element 190 is electrically non-conductive and paramagnetic and therefore inductively non-heatable. In at least one example embodiment, the induction coil 170 only surrounds the susceptor 180. The liquid retention element is in fluid communication with the tank 185 via the fluid channel 186 to be (re-)filled with aerosol-forming liquid from the tank 185.

The exemplary embodiments described above illustrate but are not limiting. In view of the above discussed exemplary embodiments, other embodiments consistent with the above exemplary embodiments will now be apparent to one of ordinary skill in the art.

We claim:

1. An aerosol-generating device comprising:
- an induction coil configured to generate an alternating electromagnetic field;
- a tank configured to hold an aerosol-forming liquid;
- a susceptor configured to be in fluid communication with the tank, the susceptor configured to hold a portion of the aerosol-forming liquid and heat the portion of the aerosol-forming liquid under influence of the alternating electromagnetic field, the susceptor including, an open-porous ceramic material; and
- a valve between the susceptor and the tank, the valve configured to permit fluid communication between the tank and the susceptor in an open position and reduce fluid communication between the tank and the susceptor in a closed position, the valve configured to be in the closed position except when the aerosol-generating device is in a desired orientation.

2. The aerosol-generating device of claim 1, wherein
- the portion of the aerosol-forming liquid is a first portion of the aerosol-forming liquid, and
- the aerosol-generating device includes a liquid-retention material configured to hold a second portion of the aerosol-forming liquid.

3. The aerosol-generating device of claim 2, wherein the liquid-retention material is between the tank and the susceptor.

4. The aerosol-generating device of claim 2, wherein the liquid-retention material is in direct contact with the susceptor.

5. The aerosol-generating device of claim 2, wherein the liquid-retention material is in fluid communication with the tank via a channel.

6. The aerosol-generating device of claim 5, wherein the valve is in the channel.

7. The aerosol-generating device of claim 2, wherein the liquid-retention material is electrically non-conductive.

8. The aerosol-generating device of claim 2, wherein the liquid-retention material is paramagnetic or diamagnetic.

9. The aerosol-generating device of claim 2, wherein the liquid-retention material has a cylindrical body.

10. The aerosol-generating device of claim 2, wherein the valve is a gravity-actuated valve.

11. The aerosol-generating device of claim 2, further comprising:
- a controller, wherein
- the valve is an electromagnetic valve, and
- the controller is configured to place the electromagnetic valve in the open position when the aerosol-generating device is in the desired orientation.

12. The aerosol-generating device of claim 1, wherein the susceptor has a cylindrical body.

13. The aerosol-generating device of claim 1, wherein the susceptor is in an interior region of the induction coil.

14. The aerosol-generating device of claim 1, wherein a distance between the susceptor and the induction coil is constant.

15. The aerosol-generating device of claim 1, wherein the open-porous ceramic material has a porosity ranging from 20% to 60%.

16. The aerosol-generating device of claim 1, wherein the open-porous ceramic material is an electrically non-conductive material.

17. The aerosol-generating device of claim 1, wherein the open-porous ceramic material includes a manganese-magnesium ferrite, a nickel-zinc ferrite, a cobalt-zinc barium ferrite, or any combination thereof.

18. The aerosol-generating device of claim 1, wherein the open-porous ceramic material has a Curie temperature ranging from 150° C. to 400° C.

19. The aerosol-generating device of claim 1, wherein the tank is configured to be refilled.

* * * * *